Oct. 28, 1958   R. G. H. WAUGH   2,858,103
GAS TURBINE APPARATUS
Filed March 26, 1956   2 Sheets-Sheet 1
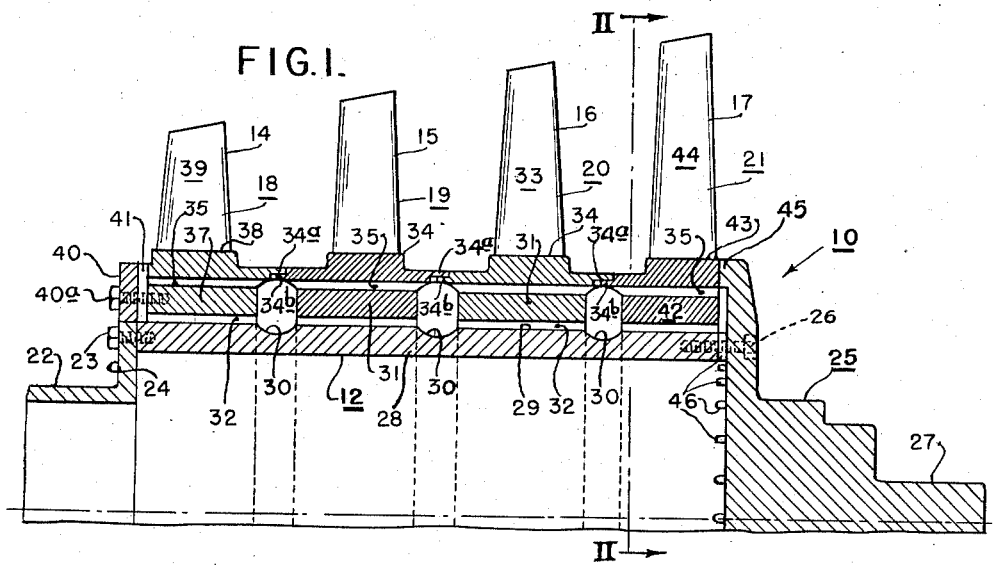
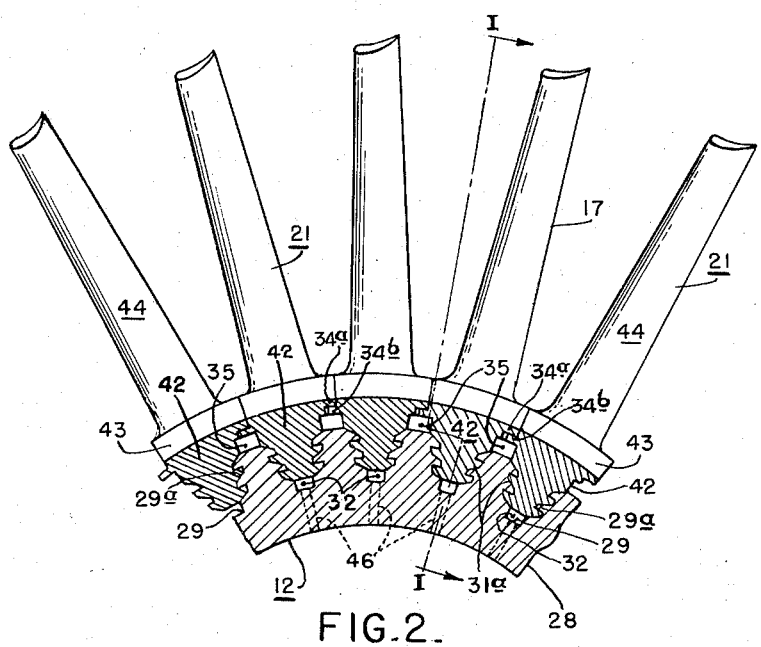
INVENTOR
RAYMOND G. H. WAUGH
AGENT

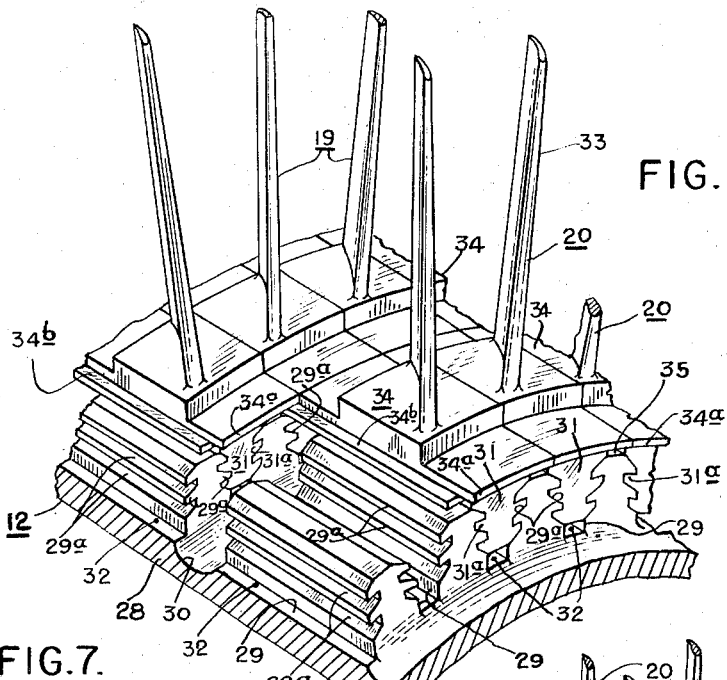
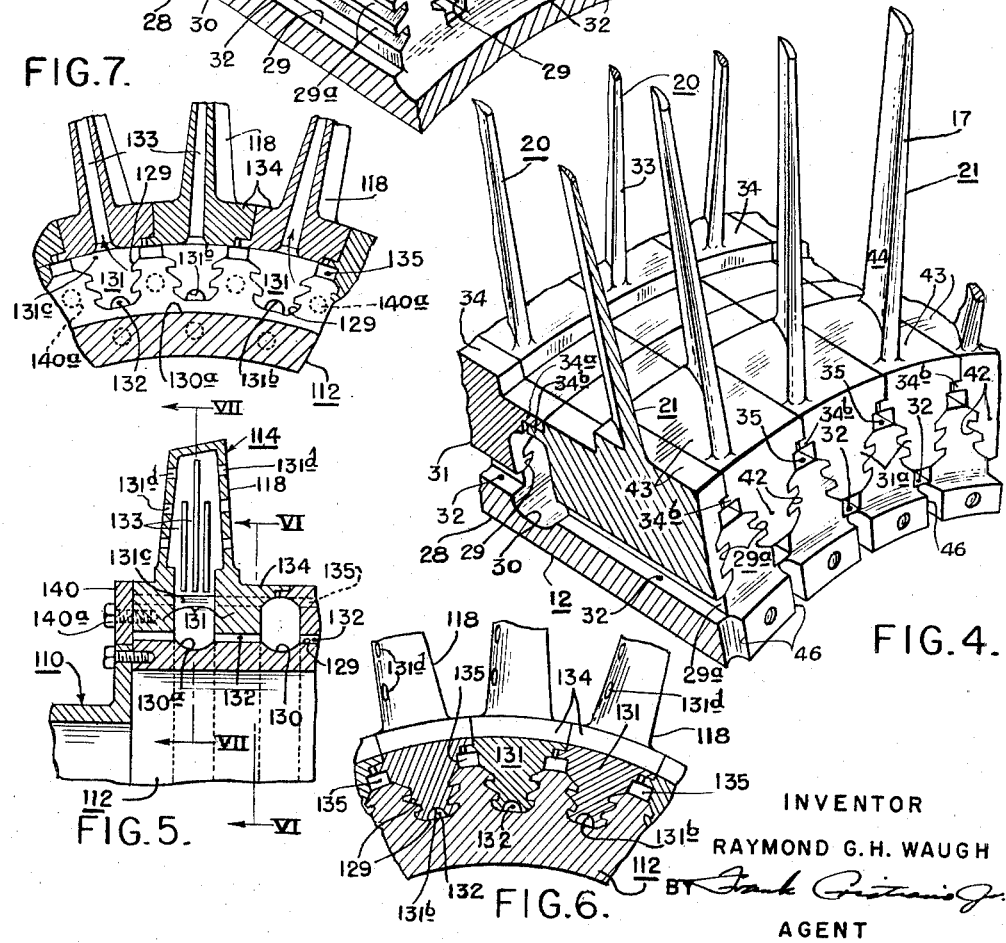
FIG. 3.
FIG. 7.
FIG. 5.
FIG. 6.
FIG. 4.
INVENTOR
RAYMOND G. H. WAUGH
AGENT

United States Patent Office 2,858,103
Patented Oct. 28, 1958

2,858,103

GAS TURBINE APPARATUS

Raymond G. H. Waugh, Chester, Pa., assignor to Westinghouse Electric Corporation, East Pittsburgh, Pa., a corporation of Pennsylvania Application March 26, 1956, Serial No. 573,729

2 Claims. (Cl. 253—39.15)

This invention relates to a rotor construction for an axial flow gas turbine, more particularly to an arrangement for cooling a rotor of the above type and has for an object to provide an improved and simplified cooled rotor construction.

Numerous arrangements for cooling rotors and rotor blades of combustion gas turbines especially axial flow gas turbines, have heretofore been proposed. Most of these arrangements, if not all, are quite complicated and difficult to manufacture by expedient methods, so that their cost is quite high for the benefits gained. It has been found advantageous to cool the rotor body as well as the blade root portions and in some instances it has been found highly desirable to cool at least the first (that is, the hottest) turbine rotor blade row. In any case, it it highly desirable to provide good, that is thorough, circulation in order to minimize localized hot spots.

In view of the above, it is a further object of the invention to provide an improved rotor construction for an axial flow gas turbine in which thorough cooling of the rotor body and blade root portions is attained in a simple and direct manner.

A further object is to provide a cooled rotor construction in which blades of the side entry type are employed and retained in a simple yet highly effective manner, and are cooled by direct heat exchange with coolant flowing past their root portions.

A more specific object is to provide a bladed rotor construction of the above type in which the vane portions of the first blade row are cooled by coolant delivered thereto after effecting cooling of the rotor body and the blade root portions of the other blade rows.

Briefly, the invention resides in providing a cylindrical tubular rotor body member with a plurality of longitudinal grooves for retaining a plurality of rows of blades of the side entry type. The longitudinal recesses and the blade root portions are so formed that separate longitudinal passageways are provided adjacent the bottom of the root portions and the blade platforms. The blade platforms have spigoted marginal portions to seal the blade platform passages from the motive gas stream and completely envelope the rotor body. A plurality of circumferential grooves, one between each blade row, are formed in the periphery of the rotor body. The circumferential grooves intersect the longitudinal grooves and together therewith form a network of interconnected passages communicating with all portions of the rotor body and blade root portions.

Coolant fluid, for example, compressed air from the compressor, is conveyed to the interior of the rotor body and thence to the passage network in a direction counter to the direction of flow of the motive gas stream by a plurality of radial passages formed in the downstream end of the rotor body. Also, passages formed in the upstream portion of the rotor body provide an exit for the vitiated coolant fluid into the motive gas stream.

The blades are retained in the longitudinal recesses by closure members attached to each end of the rotor body and disposed in abutment with the first and last rows of blades.

If desired, the vane portions of the first blade row may be provided with internal cavities extending through the blade root portions and communicating with the coolant passages to provide an exit for the coolant fluid. With this arrangement, the first blade row is cooled by the coolant fluid before final discharge of the latter into the motive gas stream.

These and other objects are effected by the invention as will be apparent from the following description and claims taken in connection with the accompanying drawing, forming a part of this application, in which:

Fig. 1 is a fragmentary longitudinal sectional view of an axial flow gas turbine rotor embodying the invention, the section being taken on line I—I of Fig. 2;

Fig. 2 is a fragmentary cross-sectional view taken on line II—II of Fig. 1;

Fig. 3 is a fragmentary perspective view of a central portion of the rotor shown in Figs. 1 and 2;

Fig. 4 is a fragmentary perspective view similar to Fig. 3 but showing the rear or downstream end of the rotor;

Fig. 5 is a fragmentary longitudinal sectional view of the upstream end of an axial flow gas turbine rotor of modified form;

Fig. 6 is a cross-sectional view taken on line VI—VI of Fig. 5 looking in the direction of the arrows; and Fig. 7 is a cross-sectional view taken on line VII—VII of Fig. 5 and looking in the direction of the arrows.

Referring to Fig. 1 of the drawing, there is shown a turbine rotor 10 for a gas turbine engine having a drumlike cylindrical rotor body portion 12 carrying a plurality of stages or annular rows 14, 15, 16 and 17 of blades 18, 19, 20 and 21, respectively. As will subsequently be described, the blades are of the well known side entry type and are somewhat similar in form but are of different lengths for well known reasons.

At the upstream end, i. e., the left end as viewed in Fig. 1, a torque tube 22 (shown in fragmentary form) is attached to the rotor body portion 12 by means of a plurality of bolts 23 extending through a radial flange 24 provided at the end of the torque tube. The torque tube 22 is utilized to connect the turbine rotor 10 to the usual compressor rotor (not shown) as well understood in the art. Also, a closure member 25 is attached to the downstream end, i. e., the right end of the rotor body by a plurality of bolts 26. The closure member 25 is provided with a circular bearing surface portion 27 for rotatably supporting the downstream end of the rotor within suitable bearing structure (not shown).

Referrings to Figs. 1, 3 and 4, the rotor body 12 is provided with a cylindrical wall 28 of ample thickness having a plurality of equally spaced longitudinal grooves 29 broached or otherwise formed therein. The grooves 29 extend the entire length of the rotor body and are provided with longitudinally serrated side walls 29a. The rotor body is further provided with three circumferential grooves 30 equally spaced from each other and disposed between the blade rows. The circumferential grooves 30 are at least as deep as the longitudinal grooves 29 and intersect the latter at all points of crossing.

Each of the longitudinal grooves 29 has received therein one of each of the blades 18, 19, 20 and 21. Since the blades 19 and 20 are substantially identical except for length, the description thereof will be directed to one of the blades 20.

The blade 20, as best shown in Fig. 3, has a root portion 31 provided with serrated side walls 31a complementary to the side walls 29a of the longitudinal groove 29, so that the blade 20 may be slid into proper position on the rotor body and retained therein against centrifugal forces and motive gas forces in a well known manner. The root portion 31 is of shorter depth than the groove 29 and together therewith forms a longitudinal inner passageway 32 for coolant fluid. The blade 20 is further provided with an airfoil shaped vane portion 33 extending from a generally rectangular platform 34. The platform 34 has a plurality of laterally projecting flanges 34a and 34b arranged to lap mating flanges on adjacent blades to provide a spigot connection sealing longitudinal outer passageways 35 from the motive gas stream. The passageways 35 are defined by the platform 34, adjacent root portions 31 and the outer face of the rotor body 12. The spigot connections between the platforms of blades 19 and 20 seal the groove 30 disposed therebetween to permit circumferential flow of coolant fluid therethrough.

The blades 18 comprising the first blade row 14 are also provided with serrated root portions 37, platforms 38 and vane portions 39. The upstream faces of the root portions 37 and platforms 38 are preferably coplanar and are retained in flush relation with the upstream edge portion of the rotor body 12 by a retaining ring 40. The retaining ring 40 is fastened to the rotor body 12 by an annular series of bolts 40a. As previously described in connection with blades 20, the root portion 37 defines with the groove 29 a continuation of the longitudinal passageway 32, while the platform 38 together with the root portions 37 of adjacent blades 18 and the outer surface of the rotor body 12 provide continuations of longitudinal passageways 35. The retaining ring 40 seals the ends of the passageways 32 and 35. However, a plurality of radial holes 41 extending through the platform 38 and the root portion 37 and registering with passageways 32 and 35 serve as exits for flow of coolant fluid therethrough.

The opposed marginal portions of blade platforms 38 and 34 extend into abutment with each other and are also provided with spigot connections, thereby sealing the adjacent circumferential groove 30 from the motive gas stream.

In similar manner, each of the blades 21 in the last blade row 17 is provided with a serrated root portion 42, a platform 43 and a vane portion 44. The root portion 42 is slidably received in the longitudinal groove 29 and together therewith defines a continuation of the longitudinal passageway 32, while the platform 43 together with the root portions 42 of adjacent blades 21 and the outer surface of the rotor body 12 provide continuations of longitudinal passageways 35.

The opposed marginal portions of blade platforms 43 and 34 extend into overlapping abutment with each other to provide spigot connections sealing the adjacent circumferential groove 30 from the motive gas stream.

The closure member 25 is provided with a laterally projecting annular flange portion 45 abutting the adjacent edges of the platforms 43 of the last row of blades and the rotor body. Also, the rotor body is provided with an annular series of radial grooves 46 which cooperate with the closure member 25 to provide communications between the interior of the rotor body 12 and the longitudinal passageways 32 and 35.

In operation, the rotor 10 is subjected to the high temperatures of the motive gases flowing past the blades 18, 19, 20 and 21, so that the blades and the rotor body 12 become highly heated. With the cooling arrangement described, coolant fluid such as compressed air is delivered to the interior of the rotor body 12 in any suitable manner. The interior of the rotor body is thus filled with pressurized air which flows through the radial grooves 46 and thence in parallel paths through the annular series of longitudinal passageways 32 and 35. After the air flows upstream through the passages 32 and 35 in the last blade row 17, it enters the adjacent circumferential groove 30 where it is redistributed and is again directed through the passages 32 and 35 in the third blade row 16. It then is discharged in the same manner into the succeeding circumferential groove 30 and redistributed. This procedure is repeated in the following blade rows 15 and 14, whereupon the air is ejected through the exit holes 41 into the motive gas stream.

As the air flows through the network of intercommunicating longitudinal passages 32 and 35 and circumferential grooves 30, it extracts heat from substantially all portions of the rotor body 12 as well as from the inner and outer portion of the blade roots and platform, so that substantially all portions of the rotor body 12 are subjected to the cooling effect of the pressurized air.

Figs. 5, 6 and 7 illustrate a modified turbine rotor 110. These views are fragmentary and show only the structure adjacent the first stage or blade row 114, since the remainder of the rotor structure may be substantially similar to that shown in the first embodiment, except as otherwise described.

The first blade row 114 comprises an annular row of side entry blades 118 carried by the rotor body 112. Each of the blades 118 is provided with a pair of spaced serrated root portions 131 retained in serrated longitudinal grooves 129. In this embodiment the root portions 131 are provided with longitudinal slots 131b cooperating with the bottom of the grooves 129 to provide the longitudinal passageways 132 for coolant air flow.

In a manner similar to that described in connection with the first embodiment, longitudinal passageways 135 are defined by portions of the rotor body 112, blade platforms 134 and root portions 131. These passages 132 and 135 intersect circumferential grooves 130 in the rotor body to provide an interconnected network for flow of coolant air. An additional circumferential groove 130a is provided in the rotor body 112 in radial alignment with the blades 118.

The blades 118 have hollow vane portions 133 communicating with passageways 131c formed between the spaced root portions 131 and communicating with the circumferential groove 130a as well as the longitudinal passageways 132 and 135. Also, a plurality of small exit apertures 131d are provided in the vane portions 133.

The blades are retained against longitudinal movement by a retaining ring 140 attached to the rotor body 112 by a plurality of bolts 140a.

In operation, coolant air is delivered from the interior of the rotor body 112 to the longitudinal pasageways 132 and 135 and redistributed by the circumferential grooves 130. However, after the coolant air is delivered to the first blade row 114 it is redistributed circumferentially by the circumferential groove 130a and directed radially outwardly through the passageways 131c and the hollow vane portions 133 to the exit apertures 131d and thence into the motive gas steam flowing past the blades.

With this arrangment, all portions of the rotor body 112 and the blade roots and platforms are cooled by the circulating coolant flow through the longitudinal passages and the circumferential grooves. As the air leaves the rotor body, it circulates through the vane portions 133 to extract further heat therefrom before final ejection. Since the first blade row is the most highly heated blade row in a turbine rotor, critical maximum temperatures therein are reduced to a lower value.

With both embodiments, removal of one or several blades for servicing purposes is easily effected without removal of the entire rotor from the engine. In the first embodiment this is attained by removing the retaining ring bolts 40a and detaching the retaining ring 40 from the rotor body 12, whereupon the blades may be slid forwardly, i. e., to the left as viewed in Fig. 1 and out of engagement with the longitudinal grooves 29.

In the second embodiment the blades may be removed from the rotor body 112, after removing the retaining ring bolts 140a and detaching the retaining ring 140, by a forward sliding motion.

It will now be seen that the invention provides an improved cooled turbine rotor construction which is easily manufactured, provides thorough and effective cooling of all parts of the rotor body and blading, and is easily and expeditiously assembled or disassembled for servicing.

Also, since the rotor body is completely enveloped and protected from the motive gas stream, the rotor body may be made of inexpensive materials in abundant supply which need not be corrosion resistant even though the motive gas stream may be highly corrosive.

Although in the first embodiment the longitudinal passageways 32 are formed by properly proportioning the blade roots and the longitudinal grooves 29 in radial direction, and in the second embodiment the longitudinal passageways 132 are provided by slotting the bottoms of the blade roots, the manner of forming the passageways 132 and 32 may be obviously interchanged if desired.

While I have shown my invention in several forms, it will be obvious to those skilled in the art that it is not so limited, but is susceptible of various other changes and modifications without departing from the spirit thereof.

What I claim is:

1. A cooled rotor for use in an axial flow gas turbine, comprising an integral tubular rotor body having a plurality of spaced circumferential grooves and a plurality of axially extending grooves formed in the outer surface thereof and coextensive therewith, said axially extending grooves intersecting said circumferential grooves at all points of crossing; a plurality of annular rows of blades provided with root portions of the side entry type received in said axially extending grooves; mutually cooperating means provided in said root portions and said axially extending grooves for locking said blades against radially outward movement; said axially extending grooves being of greater depth than said blade root portions, whereby axially extending coolant passages are provided adjacent said root portions; said blades being provided with platforms, said platforms being in spaced relation with the periphery of the rotor body, said platforms extending into abutment with each other and completely encompassing the rotor body, said platforms having inter-engaging connecting portions, whereby axially extending coolant passages are provided adjacent said platforms; said rotor body having a plurality of radial passages formed adjacent the downstream end providing a coolant fluid communication for said axially extending passages; and means disposed adjacent the upstream end of said rotor body defining exit passages in communication with said axially extending passages for directing the coolant fluid to the exterior of said rotor body.

2. A cooled rotor for use in an axial flow gas turbine, comprising an integral tubular rotor body having a plurality of spaced circumferential grooves and a plurality of axially extending grooves formed in the outer surface thereof, said axially extending grooves intersecting said circumferential grooves at all points of crossing; a plurality of annular rows of blades provided with root portions of the side entry type received in said axially extending grooves, said rows including first and last blade rows; mutually cooperating means provided in said root portions and said axially extending grooves for securing said blades against radially outward movement; said axially extending grooves being of greater depth than said blade root portions, whereby axially extending coolant passages are provided adjacent said root portions; said blades being provided with platforms; said platforms being of substantially rectangular shape and being disposed in radially outward spaced relation with the periphery of said rotor body, said platforms extending into abutment with each other and completely encompassing the rotor body, said platforms having inter-engaging connecting portions extending across said circumferential grooves, whereby circumferentially extending coolant passages are provided adjacent said platforms; said blade root portions being of the same length in axial direction as the spacing between adjacent circumferential grooves and said blade root portions being disposed between said adjacent circumferential grooves to thereby permit unimpeded flow of coolant through said circumferential passages; said rotor body having a plurality of radial passages formed adjacent the downstream end providing a coolant fluid inlet communication for said axial extending passages; means disposed adjacent the upstream end of said rotor body defining exit passages in communication with said axially extending passages for directing the coolant fluid to the exterior of said rotor body; and means including a retaining ring disposed in abutment with the upstream end of said rotor body and an end member disposed in abutment with the downstream end of said rotor body, said retaining ring and said end member extending into abutment with the platforms of said first and last blade rows, respectively, and jointly sealing the ends of said axially extending passageways and retaining said blades against movement in axial direction.

References Cited in the file of this patent

UNITED STATES PATENTS 2,656,147    Brownhill _____ Oct. 20, 1953

FOREIGN PATENTS 691,251    Great Britain _____ May 6, 1953